United States Patent
Bordini (10) Patent No.: US 7,144,022 B2
(45) Date of Patent: Dec. 5, 2006

(54) TRACTOR SUSPENSION SYSTEM

(75) Inventor: Giorgio Bordini, Tenerife Canarias (ES)

(73) Assignee: CNH America LLC, New Holland, PA (US)

( * ) Notice: Subject to any disclaimer, the term of this patent is extended or adjusted under 35 U.S.C. 154(b) by 351 days.

(21) Appl. No.: 10/921,740

(22) Filed: Aug. 19, 2004

(65) Prior Publication Data

US 2006/0038371 A1     Feb. 23, 2006

(51) Int. Cl.
  *B60G 7/02* (2006.01)
  *B60G 9/00* (2006.01)
  *B60G 9/02* (2006.01)
  *B62D 21/11* (2006.01)
  *B62D 7/06* (2006.01)

(52) U.S. Cl. .................. 280/124.109; 280/124.11; 280/124.111; 280/124.113; 280/124.114; 280/124.116; 280/124.117

(58) Field of Classification Search ......... 280/124.109, 280/124.11, 124.111, 124.113, 124.114, 124.116, 280/124.117, 98
See application file for complete search history.

(56) References Cited

U.S. PATENT DOCUMENTS

| | | | |
|---|---|---|---|
| 810,261 A | | 1/1906 | Cantelou |
| 2,862,724 A | | 12/1958 | Stover |
| 3,334,912 A | | 8/1967 | Mauck |
| 3,481,621 A | | 12/1969 | Griesenbrock |
| 5,297,648 A | * | 3/1994 | Hansen et al. ............... 180/424 |
| 5,312,123 A | * | 5/1994 | Hurlburt ................. 280/93.503 |
| 5,312,124 A | * | 5/1994 | Linde et al. ........... 280/124.113 |
| 5,320,192 A | | 6/1994 | Hayashida et al. |
| 5,322,309 A | * | 6/1994 | Hurlburt .............. 280/124.113 |
| 5,322,310 A | * | 6/1994 | Hurlburt .............. 280/124.113 |
| 5,340,138 A | * | 8/1994 | Hurlburt ................. 280/93.504 |
| 5,447,320 A | * | 9/1995 | Hurlburt ................. 280/93.504 |
| 5,447,321 A | * | 9/1995 | Hurlburt et al. ....... 280/93.504 |
| 5,476,150 A | * | 12/1995 | Hurlburt et al. ........... 180/53.7 |
| 5,476,276 A | | 12/1995 | Hurlburt |
| 5,836,415 A | * | 11/1998 | Barrowman ................. 180/266 |
| 5,879,016 A | | 3/1999 | Altherr et al. |
| 6,086,076 A | | 7/2000 | Prem et al. |
| 6,293,579 B1 | | 9/2001 | Schaeff |
| 6,502,840 B1 | | 1/2003 | Leyonhjelm et al. |
| 6,523,844 B1 | | 2/2003 | Panizzolo |
| 2004/0080134 A1 | | 4/2004 | Sap et al. |

FOREIGN PATENT DOCUMENTS

EP    0598425 A1 *  5/1994
EP    0 785 124 B1   3/2002

* cited by examiner

*Primary Examiner*—Paul N. Dickson
*Assistant Examiner*—Joselynn Y. Sliteris
(74) *Attorney, Agent, or Firm*—Stephen A. Bucchianeri; John William Stader; Michael G. Harms (57) ABSTRACT

A front suspension for a tractor has an axle that is pivotally coupled to an axle carrier to pivot about a substantially longitudinal axis. The axle carrier, in turn, is pivotally coupled to the chassis of the vehicle to pivot about a generally vertical axis. The front end of the axle carrier is supported by a counter frame that prevents the axle carrier from twisting about a longitudinal axis. The counter frame is pivotally coupled to the chassis of the tractor to pivot about a generally lateral and horizontal axis. Both the axle carrier and the counter frame are constrained to pivot about the common horizontal and lateral axis with respect to the chassis of the tractor. Springs are coupled between the counter frame and the chassis of the tractor to control the pivoting of the counter frame with respect to the tractor and provide shock absorbing for the front suspension.

21 Claims, 4 Drawing Sheets

TRACTOR SUSPENSION SYSTEM

FIELD OF THE INVENTION

The invention relates generally to agricultural tractors. More particularly, it relates to suspension and steering systems for agricultural tractors. Even more particularly, it relates to suspension and steering systems for front axles of agricultural tractors with compound steering

BACKGROUND OF THE INVENTION

In recent years, the assignee of the present application has developed a new system for steering the front wheels of an agricultural tractor. This system is capable of steering the wheels of the tractor to a degree greater than heretofore possible. This system is called "compound steering" and provides (1) the steering of front wheels with respect to the front axle, and (2) the simultaneous and coordinated steering of the front axle with respect to the chassis.

This system is shown, in U.S. Pat. No. 5,476,276. In the '276 Patent, the two front wheels are mounted on structures that are located on opposite ends of a front axle. These structures are pivotally coupled to the ends of the axle and are steerable with respect to the axle. The structures support the wheels for rotation and are called "wheel hubs" herein.

Hydraulic actuators are fixed to and between the front axle and the front wheels to pivot the front wheels with respect to the axle. Tie rods are coupled to the steering hubs and the chassis. These tie rods force the front axle to steer with respect to the chassis whenever the steering hubs steer with respect to the front axle The axle itself is T-shaped. It has a rear portion that extends backwards to a pivot joint located one or two feet behind the two front wheels. The entire weight of the vehicle is transferred through this pivot joint up through the T-shaped axle and to the two front wheels disposed at either side of the front axle.

The pivot joint itself is defined by two ball joints shown best in FIG. 2 of the '276 patent. These two ball joints are oriented one above the other to define a generally vertical pivotal axis that passes between the two of them. The front axle is fixed to turn left and right about this axis. These two ball joints constrain the front axle (1) to turn left and right about the vertical axis, and (2) to rotate slightly about a longitudinal and horizontal axis when the lower ball joint is deflected side-to-side slightly at the end of member 35. The system in the '276 patent does not permit any vertical translation of the front axle: whenever the left wheel rises up (with respect to the chassis), the right wheel always drops down (with respect to the chassis) an equal distance, and vice versa.

There are several drawbacks to the design of the '276 patent. First, in order to provide the slight up-and-down pivoting motion together with the side-to-side axle turning motion, the lower ball joint must be supported in an unusual manner. The lower ball joint must simultaneously resist any fore-and-aft movement and permit some slight lateral movement. In order to limit the motion of the lower ball joint, the joint is fixed to an elongated longitudinal member (identified as item 35 in the '276 patent) that extends a considerable distance backwards from the front suspension along the chassis of the vehicle and almost to the rear of the vehicle's engine. This member must be long enough to permit it to bend side-to-side (permitting the front axle to pivot about the longitudinal axis), yet be rigid enough to prevent the lower ball joint from moving fore-and-aft. In effect, item 35 functions as a very stiff spring when pushed in a side-to-side direction and functions as a rigid member when pushed in a fore-and-aft direction.

Another drawback of the suspension shown in the '276 patent is its great weight. The entire load on the front wheels is transferred two feet back to the rear of the T-shaped front axle to the two closely-spaced ball joints. The front axle acts as an elongated, forwardly extending cantilevered beam and therefore must be designed significantly heavier and stronger than a regular axle. This design adds considerably to the weight of the vehicle. It also adds significantly to the unsprung weight of the vehicle, which is always undesirable.

Another drawback of the suspension shown in the '276 patent is the lack of any sprung translational movement of the front axle in a vertical direction. The suspension of the '276 patent does not permit (1) the simultaneous upward movement of the two front wheels with respect to the chassis and (2) the simultaneous downward movement of the two front wheels with respect to the chassis. The front axle cannot translate with respect to the chassis of the tractor.

In the suspension of the '276 patent, both front wheels pivot about a horizontal axis passing through the upper ball joint. This horizontal axis lies in a horizontal plane that is fixed with respect to the chassis of the tractor. As a result, whenever one wheel raises, the other wheel drops. If both front wheels ever drop into a trough or both wheels hit a protrusion such as a rock, a stump, or a curb, the front suspension will not be able to absorb these impacts.

What is needed therefore is a front suspension without a cantilevered front axle. What is also needed is a front suspension having springing and shock absorption. What is also needed is a front suspension that separates the elements used to pivot the front axle about a longitudinal axis and to steer the front axle. It is an object of this invention to provide such a front suspension.

SUMMARY OF THE INVENTION

In accordance with a first aspect of the invention, a front suspension for the chassis of an agricultural tractor is provided, including a front axle having a laterally extending central portion with left and right ends, the axle further including left and right steerable wheel hubs pivotally coupled to the left and right ends, respectively, of the central portion, wherein the left and right hubs pivot with respect to the central portion about left and right vertical axes, respectively; an axle carrier pivotally coupled to the axle to permit the axle to pivot with respect to the axle carrier about a first axis; and a counter frame pivotally coupled to the axle carrier to permit the axle carrier to pivot with respect to the counter frame about a second axis; wherein the counter frame is pivotally coupled to the chassis of the tractor to pivot with respect to the chassis about a third axis.

The counter frame may have a front end and a rear end and further the counter frame may be coupled to the chassis at its rear end, and the front end of the counter frame may define a first track for pivotal motion of the axle carrier about the second axis. The second axis may be orthogonal to the first axis. The first and second axes may be co-planar. The axle carrier may be constrained to pivot with respect to the counter frame about a second axis that is orthogonal to the first axis. The axle carrier may have a front end and a rear end, the axle carrier may be pivotally coupled to the chassis at its rear end, and the front end of the axle carrier may be supported by at least one roller disposed to ride on the first track. There may be at least two rollers, and the counter frame may include a second track parallel to and spaced apart from the first track, and the first and second tracks may face each other and support opposing sides of both of the at least two rollers. The front axle may be pivotally coupled to the front end of the axle carrier, the first axis may be orthogonal to the second axis, and the first axis may be generally orthogonal to the third axis when the wheels are disposed in a straight-ahead position. The front axle may be pivotally coupled to the front end of the axle carrier, the first axis may be orthogonal to the second axis, and the first axis may be generally orthogonal to the third axis when the wheels are disposed in a straight-ahead position.

In accordance with a second aspect of the invention, a front suspension for an agricultural tractor having a chassis is provided that includes a front axle having a laterally extending beam portion with left and right ends, the axle further including left and right wheel hubs pivotally coupled to the respective left and right ends of the beam portion to pivot with respect to the beam portion about generally vertical and parallel left and right axes; an axle carrier coupled to the axle to define a first axis of relative rotation of the axle with respect to the axle carrier; and a counter frame coupled to the axle carrier to define a second axis of relative rotation of the axle carrier with respect to the counter frame; wherein the counter frame is coupled to the chassis of the tractor to define a third axis of relative rotation of the counter frame with respect to the chassis.

The counter frame may extend longitudinally and have opposing first and second longitudinal ends, the counter frame may be coupled to the chassis at its first longitudinal end, and the counter frame may support the axle carrier at its second longitudinal end. The second axis may be physically constrained to be orthogonal to the third axis, and the first axis may be generally orthogonal to the third axis when the wheels are in a straight-ahead position. The third axis may be physically constrained to be co-planar with the second axis in every operating position of the counter frame with respect to the chassis and in every operating position of the axle carrier with respect to the chassis. The axle carrier may extend longitudinally and have a front end that is supported on anti-friction bearings to pivot with respect to the counter frame, and have a rear end that is pivotally fixed directly to the chassis. The second axis may intersect the first axis in every working position of the axle with respect to the axle carrier and in every working position of the axle carrier with respect to the counter frame. The counter frame may be pivotally coupled to the chassis by at least two spaced-apart pivot joints that define the third axis, and the axle carrier may be coupled to the chassis at a joint disposed between the at least two spaced-apart pivot joints. The joint coupling the axle carrier to the chassis may be a universal joint. The second axis may extend through the universal joint in every working position of the axle carrier. The second axis and the third axis may intersect each other.

DETAILED DESCRIPTION OF THE PREFERRED EMBODIMENTS

FIGS. 1–4 illustrate a tractor 96 having a front suspension 98 and a chassis 99 in accordance with the present invention.

Figure 1:
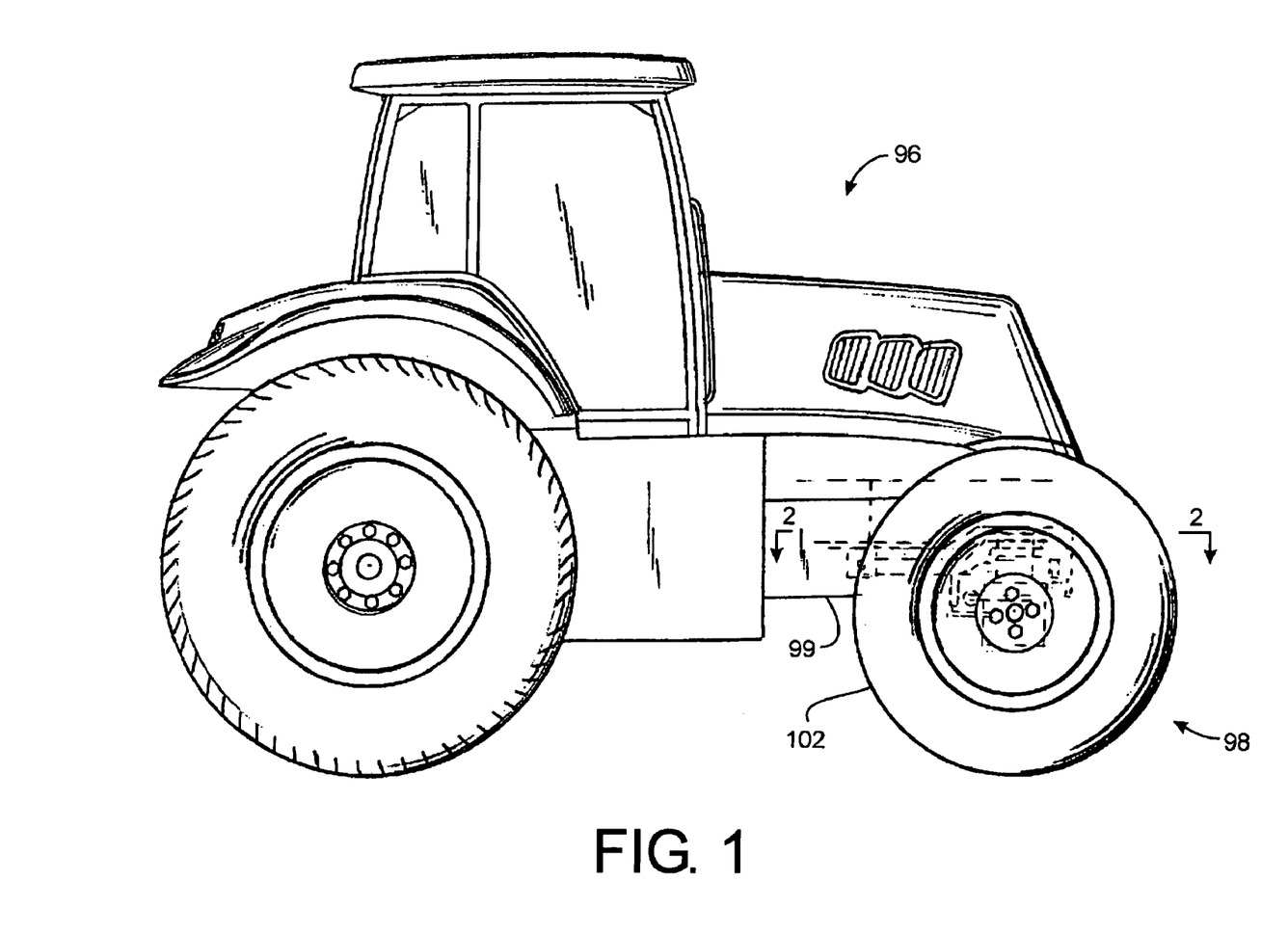
FIG. 1 is side view of a tractor in accordance with the present invention.
Figure 2:
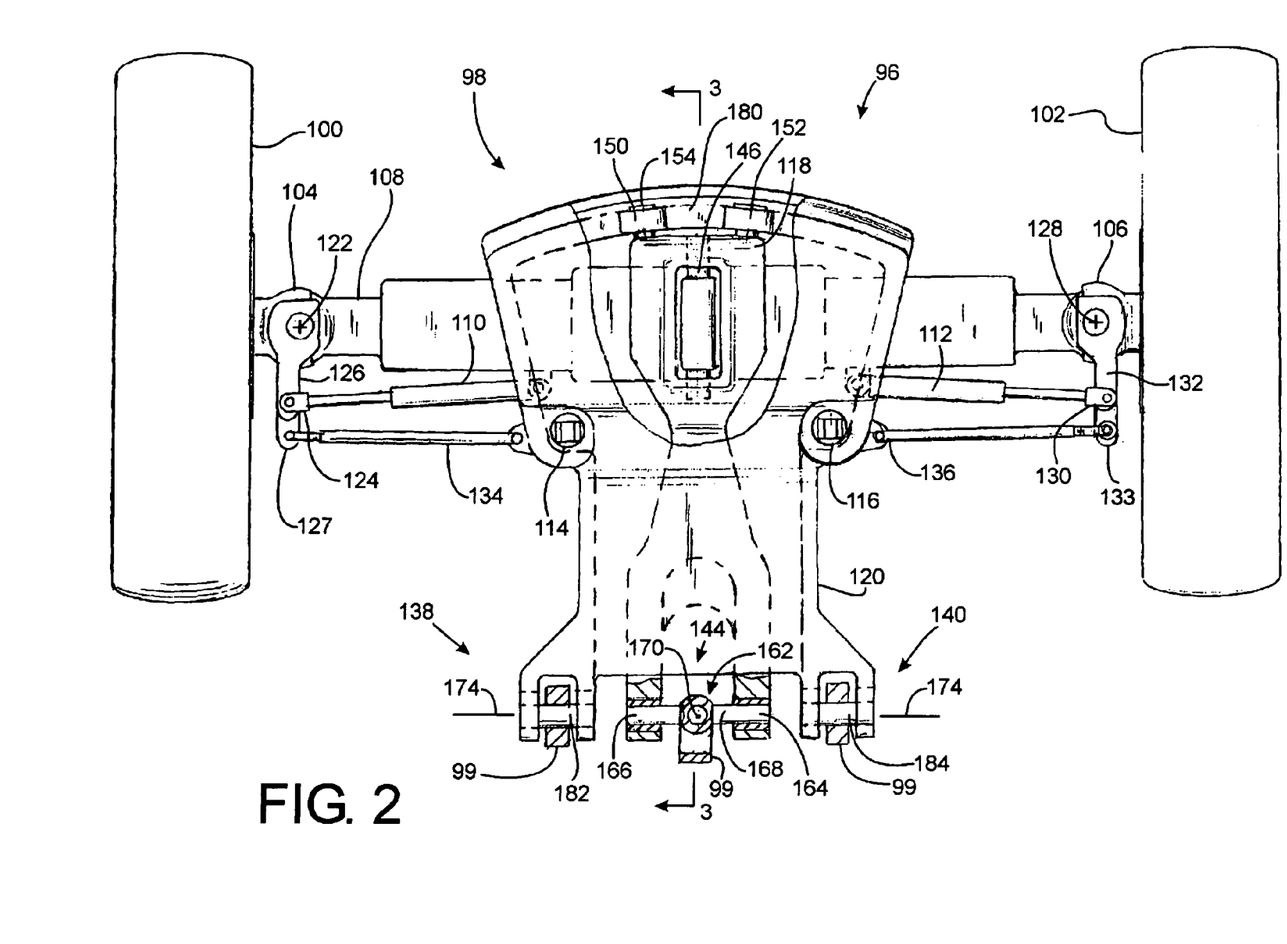
FIG. 2 is a cross-sectional top view of the tractor of FIG. 1 taken at section line 2—2 in FIG. 1 and showing the front suspension components in detail.

FIG. 2 is a top view of the tractor with the chassis removed, showing only the front suspension components. The front suspension 98 includes a left wheel 100, a right wheel 102, a left steerable hub 104, a right steerable hub 106, a front axle 108, a left steering actuator 110, a right steering actuator 112, a left spring 114, a right spring 116, and axle carrier 118, and a counter frame 120.

Left wheel 100 is rotatably fixed to left steerable hub 104 to rotate with respect thereto. Right wheel 102 is rotatably fixed to right steerable hub 106 to rotate with respect thereto.

Left steerable hub 104 is pivotally coupled to the left end of front axle 108 to pivot about a generally vertical axis 122. Steering actuator 110 is coupled at a first end 124 to a steering arm 126 extending rearward from left steerable hub 104. When steering actuator 110 extends and retracts, it pushes and pulls steering arm 126, which in turn pivots left steerable hub 104 with respect to the left end of axle 108. The other end of steering actuator 110 is coupled to front axle 108.

Right steerable hub 106 is pivotally coupled to the right end of front axle 108 to pivot about a generally vertical axis 128. Steering actuator 112 is coupled at a first end 130 to steering arm 132 extending from right steerable hub 106. When steering actuator 112 is extended and retracted, it pushes and pulls steering arm 132, which in turn pivots right steerable hub 106 with respect to the right end of axle 108. The other end of steering actuator 112 is coupled to front axle 108. Axis 128 is generally parallel to axis 122. Axes 122 and 128 may not be absolutely vertical and parallel, since small angular variations from verticality are often beneficial for reasons of reduced tire wear, reduced loads or better traction.

Tie rod 134 is coupled to and between a second steering arm 127 that extends rearward from hub 104 and counter frame 120. Similarly, tie rod 136 is coupled to and between a fourth steering arm 133 that extends rearward from hub 106. The tie rods are coupled to their steering arms and the counter frame by ball joints at each end.

The front suspension 98 is supported on the tractor at five connection points. Two of these points include couplings 138, 140, which connect counter frame 120 to the chassis of the tractor. A third connection point is coupling 144, which couples the axle carrier 118 to the tractor's chassis 99. The two remaining connection points between the front suspension and the chassis of the tractor are those portions of the tractor chassis that support the upper ends of springs 114, 116.

The front axle 108 is pivotally coupled to axle carrier 118 by a longitudinally extending pin 146. This pin extends through a cylindrical aperture 148 in the upper part of the casting that forms the body of axle 108 and into two mating apertures in axle carrier 118. These three apertures, like the pin that they support, extend in a longitudinal direction with respect to the vehicle when the wheels are disposed in a straight-ahead position. The apertures in the axle carrier that receive pin 146 are oriented parallel to the longitudinal extent of the axle carrier 118. Thus, whenever the axle carrier is in its straight-ahead position shown in FIG. 2, the relative pivotal axis defined by pin 146 is parallel to longitudinal axis of the vehicle. This arrangement constrains the front axle to pivot with respect to the axle carrier about an axis is coaxial with longitudinally extending pin 146.

Axle carrier 118 is supported at both its forward end and its after end. At its forward end it is supported by an anti-friction bearing, which are shown in FIG. 2 as two rollers 150, 152 that roll on two tracks on the counter frame. These rollers are fixed to axle carrier 118 by pins 154 156. Rollers 150, 152 are supported on pins 154, 156 such that they rotate freely about their longitudinal axes. These axes are the axes of rotation of rollers 150, 152.

Axle carrier 118 is supported at its after end by universal joint 162, which is a part of coupling 144. Universal joint 162 has a cruciform-shaped member 164 with two laterally extending arms 166, 168 that are supported in the after end of axle housing 118. Member 164 also has two opposed vertically extending arms 170, 172 that are supported by the chassis 99 of the vehicle.

Axle carrier 118 is preferably symmetric about a longitudinal and vertical cutting plane passing through the center of the vehicle. The longitudinal axis of pin 146 therefore intersects and is co-planar with the axis about which axle carrier 118 pivots with respect to counter frame 120. The longitudinal axis of pin 146 about which axle 108 pivots is also orthogonal with respect to the axis about which axle carrier 118 pivots with respect to counter frame 120.

Joint 162 permits axle carrier 118 to pivot with 2 degrees of freedom with respect to the vehicle chassis. It pivots about two axes: a lateral axis 174 that extends through universal joint 162 and a vertical axis 176 that extends through universal joint 162. Counter frame 120 also pivots about axis 174, which extends laterally across the vehicle and is horizontal.

Figure 3:
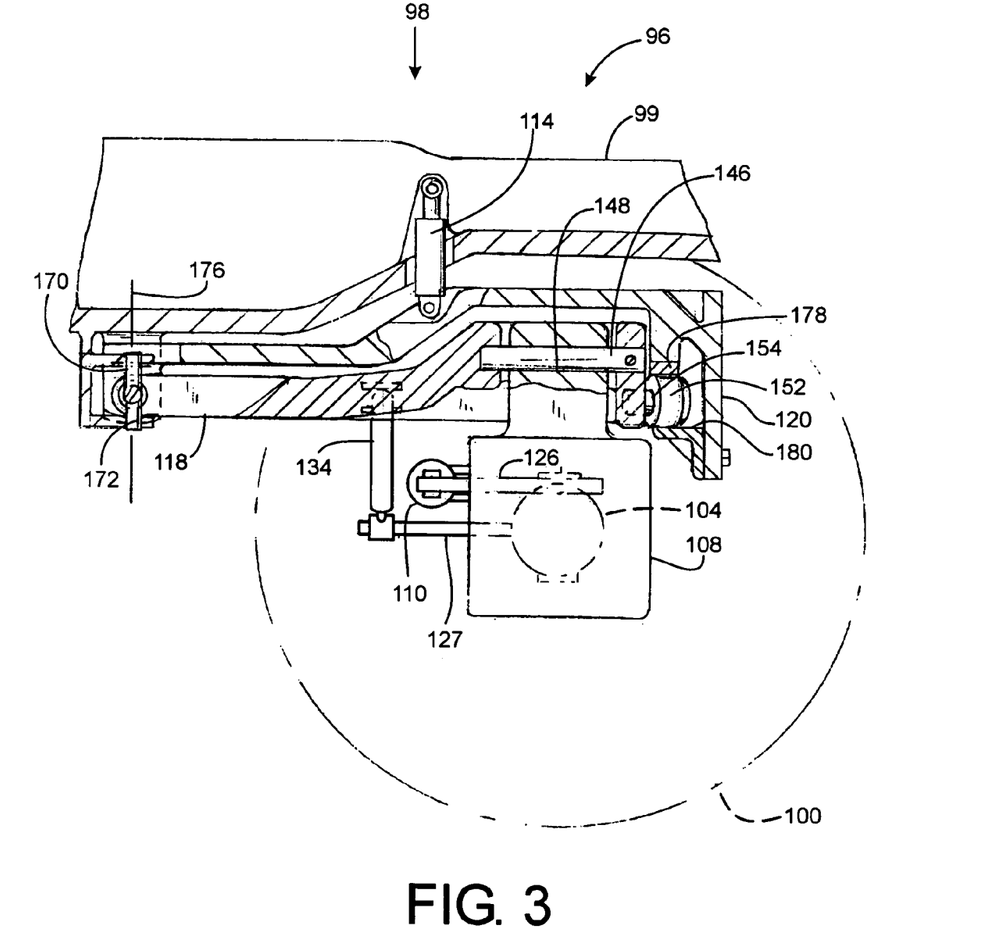
FIG. 3 is a cross-sectional view of the front suspension of FIG. 2 taken at section line 3—3 in FIG. 2 and showing the axle carrier and counter frame in greater detail.

Referring now to FIGS. 2–3, rollers 150, 152 are supported by counter frame 120. Counter frame 120 is a fan-shaped casting having two inwardly facing tracks 178, 180. Track 178 faces downward, and track 180 faces upward. These two tracks define two parallel spaced apart planar surfaces. They are called "tracks" because rollers 150, 152 roll back-and-forth on the two tracks from one end to the other when axle carrier 118 pivots about axis 176. This occurs whenever the operator steers the vehicle to the left or to the right.

The two tracks are spaced a distance apart sufficient to provide a small amount of clearance between the outer rolling surfaces of rollers 150, 152 and the inside facing surfaces of tracks 178, 180. These tracks prevent axle carrier 118 from pivoting up-and-down about lateral axis 174 with respect to the counter frame 120. Thus, whenever axle carrier 118 rotates about lateral axis 174, counter frame 120 rotates an equal amount about the same axis. The tracks constrain counter frame 120 and axle carrier 118 to pivot with respect to each other about a single relative axis of rotation. This axis of relative rotation of axle carrier 118 with respect to counter frame 120 is generally vertical when the axle carrier and the counter frame are oriented in a fore-and-aft direction as they are when the tractor is at rest on the ground. This axis of relative rotation is orthogonal to and co-planar with the horizontal lateral axis 174 about which both the counter frame 120 and the axle carrier 118 rotate with respect to the chassis. The axis of relative rotation passes through the center of universal joint 162. To sleep Tracks 178, 180 have a length of at least 20 degrees, more preferably at least 30 degrees, and even more preferably at least 50 degrees. Tracks 178, 180 extend equally to the left of and to the right of the longitudinal axis of the vehicle thus permitting turns to the left that are as great as turns to the right. Tracks 178, 180 define circular paths of roller travel. The center points of these paths are located at universal joint 162.

Both of the roller paths defined by the inner facing surfaces of tracks 178, 180 are horizontal when the vehicle is resting on the ground and the front suspension is at its normal operating height as shown in FIG. 3. While deviations from the horizontal may be permitted, it is preferable that the surfaces of tracks 178, 180 on which rollers 150, 152 travel are horizontal, and define planes that are parallel to the ground.

The tractor suspension disclosed herein permits simultaneous vertical movement of both wheels. This movement is possible because counter frame 120 to which axle carrier 118 is attached is pivotally coupled to the chassis of the vehicle.

Counter frame 120 is pivotally coupled to the chassis of the vehicle by couplings 138 and 140. These couplings are symmetric, one disposed on either side of universal joint 162. Pin 182 is inserted through two eyes in counter frame 120 and one eye in the chassis 99 of the vehicle to create coupling 138. Pin 184 is likewise inserted through two eyes in counter frame 120 and one eye in the chassis 99 of the vehicle to create coupling 140. Pins 182 and 184 extend laterally with respect to the vehicle and are coaxial with arms 166, 168 of universal joint 162 about laterally extending axis 174. Couplings 138 and 140 constrained counter frame 120 to pivot only about axis 174 with respect to the chassis 99 of the vehicle. Counter frame 120 is generally planar and parallel to the ground, and extends forward from couplings 138, 140. This configuration of counter frame 120 and its position with respect to axis 174 translates into generally vertical movement of axle 108 with respect to the chassis of the vehicle whenever counter frame 120 rotates about axis 174. Since universal joint 162 and couplings 138, 140 all pivot about axis 174 with respect to the chassis of the vehicle, rollers 150, 152 never slide, or scuff with respect to tracks 178, 180. This arrangement reduces side loads and wear on rollers 150, 152.

Springs 114, 116 support counter frame 120. Springs 114, 116 are oriented generally vertically. They are fixed at their lower ends to counter frame 120 and are fixed at their upper ends to chassis 99. Springs 114 is disposed on one side of counter frame 120 and spring 116 is disposed on the other side of counter frame 120.

Springs 114, 116 may be of any conventional spring arrangement known in the art, such as coil springs, leaf springs, torsion springs, or gas-charged hydraulic cylinders. In the preferred embodiment, however, they are hydraulic cylinders that are coupled to gas-charged hydraulic fluid accumulators (not shown). The benefit of the hydraulic arrangement is that the pressure in the accumulators and in springs 114, 116 can be varied as the load changes on the tractor. In this manner, the front suspension can be maintained at a preferred operational height as the tractor travels through the field. In a preferred embodiment, Springs 114, 116 are preferably arranged to provide at least 100 mm of vertical movement of axle 108. One of the benefits of the suspension shown herein is that the front axle is made significantly smaller than were axles in the prior art. This reduction in size is permissible since the axle 108 is not cantilevered to extend forward from the chassis of the tractor. Rather than having a large T-shaped configuration as shown in the prior art, axle 108 is relatively small and compact. Loads applied to axle 108 are transferred to a point directly above the axle defined by pin 146 where they are transferred to axle carrier 118.

Movement of the Suspension

The suspension operates in the following manner to provide simultaneous upward and simultaneous downward movement of both wheels. With the wheels in the straight ahead position shown in FIG. 1, assume the tractor meets an obstacle such as a curb, for example, that pushes upwards on both the left front wheel and the right front wheel simultaneously. In this hypothetical, the upward force acts against the wheels and pushes upward on both ends of axle 108 at the same time. Axle 108, in turn, pushes upward against pin 146 and against the front end of axle carrier 118. This upward force is transmitted by axle carrier 118 partly to universal joint 162 and partly to rollers 150, 152. Rollers 150 and 152 would responsively push upward against tracks 178 of counter frame 120. This upward pressure on track 178 causes counter frame 120 to pivot about couplings 138, 140, thereby compressing springs 114, 116. Thus, upward forces applied to both of the front wheels cause the front axle 108 to translate upward and rotate about axis 174.

In contrast to this arrangement, consider the suspension of the '276 patent. The '276 patent does not provide any simultaneous springing and shock absorption. Any sudden upward impact against both front wheels simultaneously tends to raise the entire T-shaped axle of the '276 patent. This movement is restrained in the '276 patent by the upper and lower ball joints. The upper ball joint is coupled to the chassis of the vehicle and the lower ball joint is coupled to longitudinally extending member. The only relative movement of one ball joint with respect to the other is lateral movement of the lower ball joint. Since neither ball joint can move fore-and-aft, the suspension of the '276 patent prevents any upward simultaneous movement of both front wheels. The suspension of the '276 patent does not provide simultaneous upward springing and shock absorption.

While the front wheels of the vehicle illustrated herein can both move up simultaneously, they can also move independently of one another due to the pitiful coupling of axle 108 to axle carrier 118. Since axle 108 is supported on pin 146, and since pin 146 permits the axle to pivot about a longitudinal axis with respect to axle carrier 118 (and hence with respect to the chassis of the tractor), no torsional or twisting loads about a longitudinal axis are transferred from axle 108 to chassis 99. Thus, if the sudden upward force applied to only one of the front wheels, for example, that front wheel will raise up to travel over that obstacle. When the wheel rises up, it will raise the center of the axle, which is coupled to axle carrier 118, which will compress the springs as described above. The suspension will therefore spring and absorb impacts due to upward forces acting on either (1) the left front wheel, (2) the right front wheel or (3) both front wheels simultaneously.

The springing is provided regardless of the position of axle carrier 118 with respect to counter frame 120. Whether axle carrier 118 turns to the left or turns to the right, it is always supported by tracks 178, 180 of counter frame 120. Thus, no matter what left turn or right turn position the front axle is in, any upward force applied to axle 108 will be communicated to axle carrier 118, which will be communicated upward to counter frame 120 and thence to springs 114, 116. If the front wheels are turned to the left or to the right, these upward forces may be applied through rollers 150, 152 to counter frame 120 at different points along the length of tracks 178, 180. From a dynamic point of view, however, the particular location for these forces are applied makes no difference to the operation of counter frame 120 and springs 114, 116. Upward forces applied anywhere on tracks 178, 180 will cause counter frame 120 to pivot about axis 174 and compress springs 114, 116. Thus, no matter what direction the front wheels are pointed, the front suspension always provides springing and shock-absorbing capability.

Suspension Steering

Figure 4:
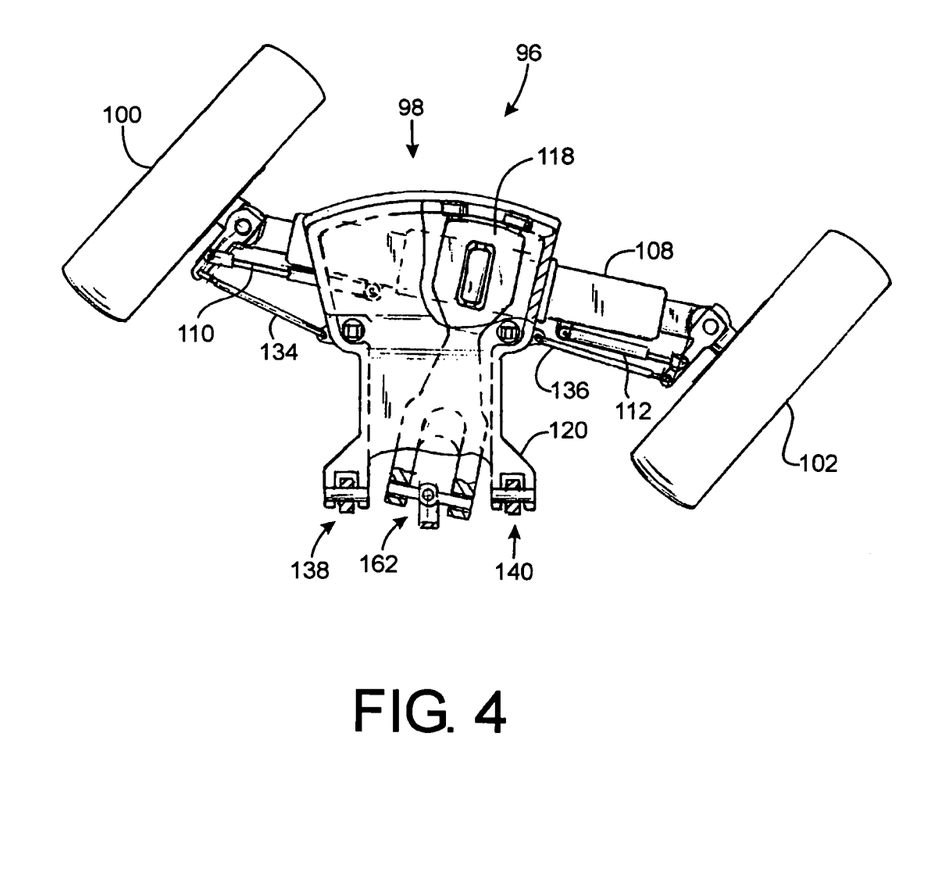
FIG. 4 is top view of the front suspension components in a right hand turn view. The view is taken at section line 2—2 in FIG. 1 and is identical to the illustration in FIG. 2, except in FIG. 4 the wheels are turned to the right.

When steering actuators 110, 112 extend and retract, they simultaneously (1) steer the front wheels 100, 102 with respect to the axle 108 and (2) steer the front axle 108 (and axle carrier 118) with respect to the chassis 99. When one actuator extends, the other retracts, and vice versa. To turn the vehicle to the right, as shown in FIG. 4, steering actuator 110 extends and steering actuator 112 retracts. This causes left steerable hub 104 and right steerable hub 106 to turn to the right with respect to axle 108. When these two hubs turn to the right, right steerable hub 106 pushes on tie rod 136 and left steerable hub 104 pulls on tie rod 134. The hubs are mounted on each end of axle 108 and the tie rods are pivotally coupled to either side of counter frame 120. Because of this, when the hubs turn to the right, they pull axle 108 to the right with respect to counter frame 120 as well.

When axle 108 is pulled to the right with respect to counter frame 120, it pulls pivot pin 146 and axle carrier 118 to the right with respect to counter frame 120 as well. When axle carrier 118 is pulled to the right, it pivots with respect to counter frame 120 and the chassis of the tractor about a generally vertical axis extending through the center of universal joint 162. As axle carrier 118 pivots to right about this vertical axis, the front end of axle carrier 118 travels to the right, causing rollers 150, 152 to roll along on the inwardly facing surfaces of tracks 178, 180.

This right turn position, described above, can be seen in FIG. 4. The description above regarding right turns applies with equal force to left turns as well, since the front suspension is symmetric about a vertical longitudinal plane passing through the longitudinal axis of the vehicle. Any leftward steering of the wheels and wheel hubs with respect to the axle causes the axle to turn to the left just as any steering of the wheels and wheel hubs with respect to the axle to the right causes the axle to turn to the right.

The tie rods coordinate the turning of wheels 100, 102 and wheel hubs 104, 106 with respect to axle 108, and the turning of axle 108 with respect to chassis 99 and counter frame 120. The particular location, links, and orientation of tie rods 134, 136 will depend upon the geometry of the other suspension complements.

It will be understood that changes in the details, materials, steps, and arrangements of parts that have been described and illustrated to explain the nature of the invention will occur to and may be made by those skilled in the art upon a reading of this disclosure while remaining within the principles and scope of the invention.

For example, an anti-friction bearing is shown supporting the front end of the axle carrier for pivoting movement with respect to the counter frame. This anti-friction bearing is shown as two rollers 150, 152 herein. One roller would suffice if universal joint 162 could be made sufficiently strong to resist twisting. Alternatively, a different anti-friction bearing could be provided, in place of the rollers, such as a flat lubricated surface that makes sliding contact with tracks 178, 180. As another alternative, any anti-friction bearing components on the counter frame and axle carrier could be exchanged. For example, the two tracks on the counter frame could be replaced with rollers and the two rollers on the axle carrier could be replaced with tracks.

As another example, two steering actuators 110, 112 are shown coupled between axle 108 and steering hubs 104, 106. Only one of these actuators is necessary. Tie rods 134, 136 are shown fixed to the same steering arm to which steering actuators 110, 112 are fixed. This is not necessary. Hubs 104, 106 can be provided with a different connection for either the steering arm or the steering actuator. It is only for convenience that both are coupled to the same steering arm. Two springs 114, 116 are shown herein. Either one of the springs can be eliminated. Additional springs can also be provided, if necessary. Springs 114, 116 are disposed symmetrically on either side of counter frame 120. If counter frame 120 is sufficiently strong, a single spring can be provided that is symmetrically located. While springs 114, 116 are shown disposed in a fore-and-aft position generally halfway between rollers 150, 152 and couplings 138, 140, this position is not necessary. Springs 114, 116 (or only one of them) may alternatively be located at another point between the counter frame 120 and the chassis of the tractor. Tie rods 134, 136 are provided to coordinate the turning of the wheels with respect to the axles and the axle with respect to the counter frame. This is not necessary. In another configuration, for example, separate actuators can be provided to turn the hubs with respect to the axle and to turn the axle with respect to the counter frame. The movements of these actuators can be coordinated by hydraulic circuits or electrical circuits. Steering actuators 110, 112 are shown herein as hydraulic cylinders that extend and retracted order to operate. This is not necessary. The steering actuators may be electric, hydraulic, or mechanical. They may be linear actuators (as shown here) or rotary actuators. The joint coupling axle carrier 118 to the chassis the vehicle is shown as a universal joint. This is not necessary. Given the strengths on twisting provided by the pair of rollers 150, 152, a ball joint could replace the universal joint. A universal joint is shown coupling axle carrier 118 directly to the chassis of the vehicle. This is not necessary. Axle carrier 118 can be pivotally coupled to counter frame 120, preferably in the same general location) to pivot about a single axis (generally vertical) with respect to counter frame 120. This coupling of axle carrier to counter frame could be a simple as a single pin joint with 1 degree of freedom that defines a single axis of rotation of the axle carrier with respect to the counter frame.

The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

I claim:

1. A front suspension for a chassis of an agricultural tractor, comprising:
    a front axle having a laterally extending central portion with left and right ends, the axle further including left and right steerable wheel hubs pivotally coupled to the left and right ends, respectively, of the central portion, wherein the left and right hubs pivot with respect to the central portion about left and right vertical axes, respectively;
    an axle carrier pivotally coupled to the axle to permit the axle to pivot with respect to the axle carrier about a first axis; and
    a counter frame pivotally coupled to the axle carrier to permit the axle carrier to pivot with respect to the counter frame about a second axis;
    wherein the counter frame is pivotally coupled to the chassis of the tractor to pivot with respect to the chassis about a third axis.

2. The front suspension of claim 1, wherein the counter frame has a front end and a rear end and further wherein the counter frame is coupled to the chassis at the rear end, and further wherein the front end of the counter frame defines a first track for pivotal motion of the axle carrier about the second axis.

3. The front suspension of claim 2, wherein the second axis is orthogonal to the first axis.

4. The front suspension of claim 3, wherein the second and third axes are co-planar.

5. The front suspension of claim 1, wherein the axle carrier is constrained to pivot with respect to the counter frame about the second axis and further wherein the second axis is constrained to be orthogonal to the first axis.

6. The front suspension of claim 5, wherein the second axis is co-planar with the first axis.

7. The front suspension of claim 1, wherein the second axis is orthogonal to the first axis.

8. The front suspension of claim 2, wherein the axle carrier has a front carrier end and a rear carrier end, and further wherein the axle carrier is pivotally coupled to the chassis at the rear carrier end, and further wherein the front carrier end of the axle carrier is supported by at least one roller disposed to ride on the first track.

9. The front suspension of claim 8, wherein the at least one roller includes at least two rollers, and further wherein the counter frame includes a second track parallel to and spaced apart from the first track, and further wherein the first and second tracks face each other and support opposite sides of both of the two rollers.

10. The front suspension of claim 8 wherein the front axle is pivotally coupled to the front end of the axle carrier, wherein the first axis is orthogonal to the second axis, and further wherein the first axis is generally orthogonal to the third axis when the wheel hubs are disposed in a straight-ahead position.

11. The front suspension of claim 1, wherein the front axle is pivotally coupled to a front end of the axle carrier, wherein the first axis is orthogonal to the second axis, and further wherein the first axis is generally orthogonal to the third axis when the wheel hubs are disposed in a straight-ahead position.

12. A front suspension for an agricultural tractor having a chassis, comprising:
    a front axle having a laterally extending beam portion with left and right ends, the axle further including left and right wheel hubs pivotally coupled to the respective left and right ends of the beam portion to pivot with respect to the beam portion about generally vertical and parallel left and right axes;
    an axle carrier coupled to the axle to define a first axis of relative rotation of the axle with respect to the axle carrier;
    a counter frame coupled to the axle carrier to define a second axis of relative rotation of the axle carrier with respect to the counter frame; an
    at least one spring coupled to and between the chassis and the counter frame to spring support the front axle and permit translation of the front axle with respect to the chassis
    wherein the counter frame is coupled to the chassis of the tractor to define a third axis of relative rotation of the counter frame with respect to the chassis.

13. The front suspension of claim 12, wherein the counter frame extends longitudinally and has opposing first and second longitudinal ends, and wherein the counter frame is coupled to the chassis at the first longitudinal end, and wherein the counter frame supports the axle carrier at the second longitudinal end.

14. The front suspension of claim 13, wherein the second axis is physically constrained to be orthogonal to the third axis, and wherein the first axis is generally orthogonal to the third axis when the wheel hubs are in a straight-ahead position.

15. The front suspension of claim 14, wherein the third axis is physically constrained to be co-planar with the second axis in every operating position of the counter frame with respect to the chassis and in every operating position of the axle carrier with respect to the chassis.

16. The front suspension of claim 12, wherein the axle carrier extends longitudinally, having a front end that is supported on anti-friction bearings to pivot with respect to the counter frame, and having a rear end that is pivotally fixed to the chassis.

17. The front suspension of claim 16, wherein the second axis intersects the first axis in every working position of the axle with respect to the axle carrier and in every working position of the axle carrier with respect to the counter frame.

18. The front suspension of claim 12, wherein the counter frame is pivotally coupled to the chassis by at least two spaced-apart pivot joints that define the third axis, and further wherein the axle carrier is coupled to the chassis at a joint disposed between the two spaced-apart pivot joints.

19. The front suspension of claim 18, wherein the joint coupling the axle carrier to the chassis is a universal joint.

20. The front suspension of claim 19, wherein the second axis extends through the universal joint in every working position of the axle carrier.

21. The front suspension of claim 20, wherein the second axis and the third axis intersect each other.

* * * * *